United States Patent [19]

Katz et al.

[11] Patent Number: 4,911,941
[45] Date of Patent: Mar. 27, 1990

[54] METHOD FOR DECAFFEINATING COFFEE WITH A SUPERCRITICAL FLUID

[75] Inventors: Saul N. Katz, Monsey, N.Y.; Jean E. Spence, Bogota, N.J.; Michael J. O'Brien, Port Monmouth, N.J.; Ronald H. Skiff, Edison, N.J.; Gerald J. Vogel, Carrollton, Tex.; Ravi Prasad, Midlothian, Va.

[73] Assignee: General Foods Corporation, White Plains, N.Y.

[21] Appl. No.: 229,380

[22] Filed: Aug. 5, 1988

[51] Int. Cl.⁴ .................................................. A23F 5/20
[52] U.S. Cl. ................................. 426/427; 426/478; 426/479; 426/481; 426/432
[58] Field of Search ............... 426/422, 424, 427–428, 426/432–434, 478–479, 481

[56] References Cited

U.S. PATENT DOCUMENTS

| | | | |
|---|---|---|---|
| 2,896,740 | 7/1959 | Drummond | 183/3 |
| 3,088,394 | 5/1963 | Thornhill | 99/283 |
| 3,092,515 | 6/1963 | Pike et al. | 134/25 |
| 3,640,054 | 2/1972 | Katz | 55/228 |
| 3,806,619 | 4/1974 | Zosel | 134/25 |
| 3,862,347 | 1/1975 | Thijssen et al. | 426/434 |
| 3,969,196 | 7/1976 | Zosel | 203/49 |
| 4,007,116 | 2/1977 | Gappa | 210/33 |
| 4,168,324 | 9/1979 | Roselius et al. | 426/312 |
| 4,246,291 | 1/1981 | Prasad et al. | 426/387 |
| 4,247,570 | 1/1981 | Zosel | 426/481 |
| 4,251,559 | 2/1981 | Margolis et al. | 426/490 |
| 4,255,458 | 3/1981 | Roselius et al. | 426/424 |
| 4,260,639 | 4/1981 | Zosel | 426/478 |
| 4,312,646 | 1/1982 | Fattinger | 55/218 |
| 4,322,445 | 3/1982 | Peter et al. | 426/312 |
| 4,341,804 | 7/1982 | Prasad et al. | 426/387 |
| 4,348,422 | 9/1982 | Zosel | 426/475 |
| 4,364,964 | 12/1982 | van der Stegen | 426/422 |
| 4,364,965 | 12/1982 | van der Stegen et al. | 426/481 |
| 4,409,253 | 10/1983 | Morrison et al. | 426/427 X |
| 4,411,923 | 10/1983 | Hubert et al. | 426/271 |

FOREIGN PATENT DOCUMENTS

0010636  5/1980  European Pat. Off.

OTHER PUBLICATIONS

Hassler, John W., *Activated Carbon*, Chemical Publishing Co., Ind., New York, N.Y. (1974), pp. 74–86.

*Primary Examiner*—Joseph Golian
*Attorney, Agent, or Firm*—Daniel J. Donovan; Thomas R. Savoie

[57] ABSTRACT

A method of continuously decaffeinating moistened, green coffee solids with supercritical carbon dioxide. Moistened, green coffee beans are moved periodically through an extraction vessel and contacted with continuously flowing supercritical carbon dioxide which extracts caffeine from the moist, green coffee beans. Caffeine is removed from the supercritical carbon dioxide by counter-current contact with wash water in an open vessel. The caffeine-depleted supercritical carbon dioxide is recirculated back to the extraction vessel and the caffeine-bearing wash water is subjected to concentration by reverse osmosis. Acidic, substantially caffeine-free permeate is directed back to the extraction system as wash water, or to moisturize the green coffee beans prior to extraction, or both.

6 Claims, 3 Drawing Sheets

METHOD FOR DECAFFEINATING COFFEE WITH A SUPERCRITICAL FLUID

TECHNICAL FIELD

The present invention relates to a method of extracting caffeine from green coffee beans with a supercritical fluid. More particularly, the invention involves continuously feeding an essentially caffeine-free supercritical fluid to one end of an extraction vessel containing moist green coffee beans and continuously withdrawing a caffeine-laden supercritical fluid from the opposite end. A portion of decaffeinated beans is periodically discharged while a fresh portion of undecaffeinated beans is essentially simultaneously charged to the extraction vessel. Substantially all the caffeine is then removed from the caffeine-laden supercritical fluid stream in a countercurrent water absorber. The caffeine present in the water exiting the absorber is subjected to reverse osmosis to obtain a concentrated caffeine solution and a permeate stream containing dissolved non-caffeine solids and substantially no caffeine. The permeate stream is recycled to the green coffee prior to extraction or the water absorber to not only recover solids, but increase the rate of caffeine extraction from the green coffee. The method of the present invention is more efficient and produces a better quality decaffeinated coffee than prior art batch processes.

BACKGROUND ART

Various coffee decaffeination methods are well-known in the art. The most common techniques involve first swelling the coffee beans with water and then extracting the caffeine with an organic solvent or a caffeine-deficient solution of green coffee solubles which solution is then itself contacted with a solvent to remove the caffeine therefrom. In either case, at least some of the solvent typically contacts the beans, leaving minute traces therein. The most useful solvents are halogenated hydrocarbons, but it is becoming increasingly desirable to avoid such solvents so as to leave the coffee free of any trace solvent.

One of the more promising, although costly, alternative techniques is the use of a supercritical fluid, preferably supercritical carbon dioxide, to extract the caffeine from green coffee beans. Such a technique is disclosed in U.S. Pat. No. 4,260,639 to Zosel wherein green coffee is contacted with water-moist supercritical carbon dioxide in order to extract the caffeine. The caffeine may be absorbed from the caffeine-laden supercritical carbon dioxide by bubbling the carbon dioxide through a water reservoir, said reservoir being replaced by fresh water every 4 hours, as disclosed in U.S. Pat. No. 3,806,619 to Zosel. However, such a recovery system is highly inefficient because the water reservoir fails to provide a continuous driving force for caffeine recovery and the periodic replacement of the reservoir results in an undesirable discontinuity in the process.

In still another technique, disclosed in U.S. Pat. No. 4,247,570 to Zosel, the green coffee is mixed with a caffeine adsorbent prior to contact of the coffee and the supercritical fluid. Then, as the caffeine is extracted by the supercritical fluid, it is adsorbed by the caffeine adsorbent, eliminating the need for a separate caffeine removal step. The prior art methods are batch techniques which tend to be less efficient than would be more nearly continuous methods. In addition, loss of non-caffeine solids in solid absorbents and in purging the system adversely effects the green coffee roasted flavor.

An advantage of the present invention is a more nearly continuous method of extracting caffeine from green coffee beans with a supercritical fluid removal of the caffeine and recovery and recycle of non-caffeine solids to the green coffee.

Another advantage is to produce a decaffeinated coffee of improved quality by limiting the loss of non-caffeine solids during decaffeination and by decreasing substantially the residence time of green beans in the process.

SUMMARY OF THE INVENTION

It has now been found that the objects of the invention are met by a method which involves continuously feeding an essentially caffeine-free supercritical fluid to one end of an extraction vessel and continuously withdrawing a caffeine-laden supercritical fluid from the opposite end of the vessel. Periodically, a portion of decaffeinated coffee beans is discharged at the end of the vessel to which the caffeine-free supercritical fluid is fed while a portion of undecaffeinated beans is charged to the opposite end. The caffeine-laden supercritical fluid is then fed to a countercurrent liquid absorber wherein caffeine is transferred from the supercritical fluid to a polar fluid. The then essentially caffeine-free supercritical fluid is recycled to the extraction vessel. The caffeine rich liquid is then fed to a reverse osmosis unit to recover 98% of the caffeine which has been concentrated and an acidic substantially caffeine free permeate to be recycled to either the absorber or the green coffee.

DETAILED DESCRIPTION OF THE INVENTION

Figure 1:
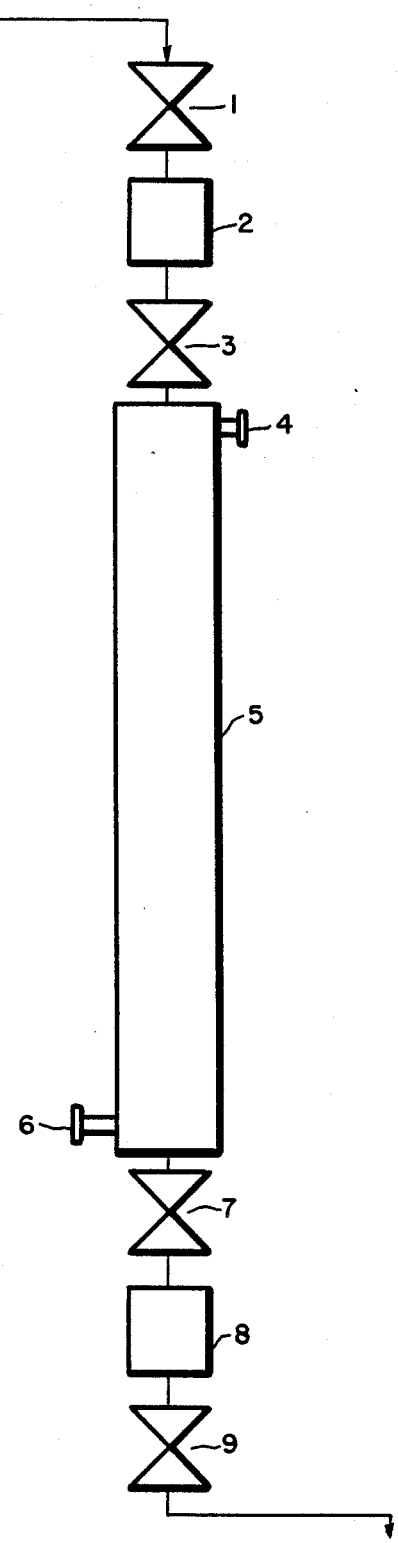
FIG. 1 is a schematic illustration showing an extraction vessel.

According to the present invention, caffeine is extracted from the green coffee beans with a supercritical fluid. A supercritical fluid is a fluid, typically one which is gaseous at ambient conditions, which is maintained at a temperature above its critical temperature and at a pressure above its critical pressure. Suitable supercritical fluids for use in the present invention include carbon dioxide, nitrogen, nitrous oxide, methane, ethylene, propane and propylene. Carbon dioxide, having a critical temperature of 31° C. and a critical pressure of 72.8 atmospheres, is particularly preferred. Carbon dioxide is abundantly available, relatively inexpensive, non-explosive and thoroughly safe for use in food processing. The supercritical fluids may be used either individually or in combinations, as mixed supercritical solvents.

In addition, a so-called enhancer may be added to the supercritical fluid to improve the solvent characteristics of the supercritical fluid. The most useful enhancers are the low to medium boiling alcohols and esters. Typical enhancers include methanol, ethanol, ethyl acetate and the like. The enhancers may be added to the essentially caffeinefree supercritical fluids at proportions of between about 0.1% and 20.0% by weight. The enhancers contemplated for use herein are most typically not supercritical fluids at the disclosed operating conditions but rather, the enhancers are simply dissolved in the supercritical fluid, improving its solvent properties.

In one embodiment the chosen enhancer is combined with the essentially caffeine-free supercritical fluid at the described proportions prior to feeding the supercritical fluid to the extraction vessel. Alternatively, the essentially caffeine-free supercritical fluid is fed to the extraction vessel without the enhancer. The enhancer is then introduced into the extraction vessel and thereby combined with the supercritical fluid at a point at which the supercritical fluid has progressed through between one-quarter and one-third of the length of the column. Operation in this manner provides for some washing of the beans with enhancer-free supercritical fluid so as to remove any residue of the enhancer from the coffee beans.

The extraction vessels intended for use herein include those which provide for efficient contact of the green coffee beans and the supercritical fluid, and which are capable of withstanding the necessarily elevated pressures involved with the use of supercritical fluids. The preferred extraction vessel is an elongated column, having a length between four and ten times the diameter, so that the green coffee beans are maintained as a bed as the supercritical fluid passes therethrough. The extraction vessel, particularly an elongated column, is most typically situated vertically so as to take advantage of gravity in providing the movement of the beans through the vessel.

Inasmuch as the supercritical fluid extraction method is countercurrent, the end of the vessel from which the decaffeinated coffee beans are discharged is also the end to which the essentially caffeine-free supercritical fluid is fed, and the end of the vessel to which the undecaffeinated green coffee is charged is also the end from which the caffeine-laden fluid is withdrawn. For the vertical elongated vessel, it is preferable to discharge the portion of decaffeinated coffee from the bottom of the vessel so as to best use gravity in assisting the movement of the green coffee through the column. The progression of the green coffee bed through the vessel arises from the periodic discharging and charging of the portions of green coffee. When the portion of decaffeinated green coffee is periodically discharged, the weight of the coffee bed causes said bed to shift downward, with the void created at the top of the column being filled by the portion of undecaffeinated coffee which is simultaneously charged to the vessel. The net effect is the progression of the green coffee charged to the extraction vessel downward through the column whereupon the decaffeinated coffee is eventually discharged. Of course, it is not necessary to situate the column vertically nor to discharge the decaffeinated green coffee from the bottom of the vessel, but such a scheme is the most convenient, particularly with respect to charging and discharging of the green coffee beans.

In view of the high pressures involved, the periodic charging and discharging of the coffee is most easily accomplished through the use of intermediate pressure vessels known as blow cases. Blow cases are merely smaller pressure vessels of about the same volume as the portions of coffee that are periodically charged and discharged, and which are isolated on both ends by valves, typically ball valves. A blow case is situated both immediately above and below the extraction vessel and each connects therewith through one of the valves. Prior to the time for the periodic charging and discharging, the upper blow case (for the embodiment of a vertical elongated vessel) is filled with the desired volume of beans, which blow case is then isolated. The remaining void space in the blow case is then filled with the supercritical fluid so as to increase the pressure to that maintained in the extraction vessel. The lower blow case is pressurized with the supercritical fluid. When it is time for the periodic charging and discharging, the valve connecting the lower, pressurized blow case with the extraction vessel is opened. Similarly, the valve connecting the upper blow case and the extraction vessel is opened, charging the undecaffeinated coffee beans to the vessel. Both valves are then shut. The upper blow case is essentially empty but for a small amount of supercritical fluid. The lower blow case contains the decaffeinated coffee and some supercritical fluid. The supercritical fluid in the lower blow case may be vented to a holding vessel or the upper blow case prior to emptying the beans therefrom so as to conserve the costly fluid. Alternatively, rotary locks of the sort known for use on pressure vessels may be used to provide smoother, more easily automated operation. However, such rotary locks tend to be more mechanically complex, costing more initially and generally requiring more maintenance.

The discharging of the portion of decaffeinated green coffee beans and charging of the portion of undecaffeinated beans is carried out periodically, after a period of time established as hereinbelow described. The portion of decaffeinated beans periodically discharged most preferably ranges between 5% and 33% of the volume of the green coffee contained in the extraction vessel. Similarly, the portion of undecaffeinated coffee beans periodically charged to the vessel is also measured as against the volume of the coffee bed. A height about equal to the portion of discharged decaffeinated beans is simultaneously charged to the opposite end, usually the top, of the elongated vessel. For instance, if 15% of the volume of the green coffee bed is discharged the equivalent 15% of the volume is then simultaneously charged to the vessel as undecaffeinated green coffee beans.

Particular operating conditions are obviously related to the configuration of a given system, but the invention is most preferably operated so as to maximize productivity while providing sufficient decaffeination of the green beans, from which it is typically desired to extract at least 97% of the caffeine initially present. Two of the more important operating conditions are the weight ratio of supercritical fluid to coffee and the frequency of the periodic discharging and charging of the coffee beans. There are competing aims in choosing the optimal weight ratio. It is, of course, preferable to use the least possible amount of the supercritical fluid so as to minimize operating expense. However, use of an insufficient amount of the fluid impairs productivity and raises the caffeine concentration of the caffeine-laden supercritical fluid to its maximum obtainable level prior to reaching the desired level of decaffeination, thereby eliminating the overall driving force for the extraction of caffeine from the green coffee beans. It has been found that the weight ratio of supercritical fluid to coffee is most preferably between 30 and 100 kg. supercritical fluid/kg. coffee processed through the vessel.

The frequency of the periodic charging and discharging is also a significant operating condition related to decaffeination efficiency. It is desirable to maximize productivity but it is also important to extract the desired amount of caffeine from the beans and so the frequency of the discharging and charging must be balanced between the two objects. The most preferable frequency will depend on a given system, but it has been found that the portions of substantially decaffeinated coffee beans are conveniently discharged between about every 10 and 120 minutes. Considering that the charging of the portion of undecaffeinated green coffee beans is most preferably concurrent with the discharging of the beans, the frequency of the charging of the portions of undecaffeinated beans is also between about every 10 and 120 minutes. The total residence time of the green coffee beans in the extraction vessel is established by the frequency of the periodic discharging and charging in addition to the size of the portion periodically discharged and charged. Thus, if 15% of the volume of an elongated column is discharged (and the corresponding portion charged) every 54 minutes, the total residence time of the beans in the vessel is 6 hours. According to the limits hereinbefore set, the total residence time of the green coffee beans in the elongated vessel is between about 2 and 13 hours.

In addition, the temperature and pressure maintained in the extraction vessel are also significant operating variables because both temperature and pressure must be above the critical constants so as to give the super critical fluid. Although there is no corresponding upper limit on the temperature or pressure, the temperature should not be so high as to damage the quality of the beans nor the pressure so high as to require excessively expensive equipment. The green beans are sensitive to the effects of temperature with different types of beans having varying degrees of tolerance for increased temperature. A temperature in excess of about 100° C. may tend to degrade the flavor of some green bean types. The rate of decaffeination, though, is favored by a relatively high temperature and so it is not desirable to feed the supercritical fluid to the vessel precisely at the critical temperature. It is preferable to maintain the temperature in the extraction vessel between about 70° C. and 140° C., preferably 80°–140° C. and more preferable to maintain the temperature between about 80° C. and 100° C., preferably for arabica, or 100° C. to 120° C. for Robusta depending on the green bean tolerance to temperature. The pressure in the vessel must be maintained at at least the critical pressure in order to provide for the supercritical fluid. It has long been known that increasing pressure increases the solvent capacity of the supercritical fluid. However, a point is reached, typically at around 400 atmospheres, where the increased capacity does not justify the added expense of maintaining such pressures.

It may be desirable to introduce moisture into the system to facilitate decaffeination. The undecaffeinated green coffee beans may be moisturized prior to charging the beans through the extraction vessel, solubilizing the caffeine contained in the beans, thereby making the solubilized caffeine more easily extractable. The undecaffeinated beans are typically moisturized to between about 25% and 50% by weight moisture. In addition, the essentially caffeine-free supercritical fluid may be saturated with water prior to being fed to the extraction vessel. Such saturation of a supercritical fluid is typically between about 1% and 3% by weight moisture. Decaffeination efficiency is thus increased by introducing moisture into the system.

It has been found according to the present invention that countercurrent operation of the supercritical fluid caffeine extraction step achieves an improved decaffeination efficiency and allows the production of a decaffeinated coffee of improved quality over prior art systems. The contact of a supercritical fluid with caffeine-containing green coffee beans results in a partitioning of caffeine between the fluid and the beans regardless of the system design. It is, of course, desirable to partition as much caffeine from the beans into the fluid as is possible. However, said partitioning is limited by the relative solubility of the caffeine in the supercritical fluid versus its solubility in the green coffee bean. A partition coefficient may be calculated based on experimental measurements at a given set of conditions, said partition coefficient being defined as the concentration of caffeine in the supercritical fluid divided by the concentration of caffeine in the green coffee beans, at an equilibruim point. The conditions which generally effect a partition coefficient include temperature, pressure, and moisture level of the green beans. For example, the partition coefficient for supercritical $CO_2$ as a caffeine solvent for green coffee beans has been calculated to be 0.026 at a temperature of about 85° C., a pressure of about 250 bar, and a green bean moisture level of about 35 to 40% by weight.

It has been found that the continuous countercurrent system of the present invention offers a tremendous advantage over prior art batch systems because the caffeine-laden supercritical fluid, just before it exits the extraction vessel, is then in contact with fresh green coffee beans having the green coffee's naturally occurring caffeine level. The naturally occurring caffeine level differs depending on the type of green beans being decaffeinated. For example, Robusta coffees typically have a caffeine level of about 2.0% by weight whereas Colombian coffees are typically about 1.1% by weight caffeine, as is. Because the exiting supercritical fluid is in contact with fresh green beans, the caffeine concentration in the exiting supercritical fluid increases to its asymptotic limit, or nearly thereto, based on the caffeine partition coefficient for the given fluid. It has been found that with counter-current operation the caffeine concentration in the supercritical fluid exiting the extraction column is typically at least 40% of the maximum obtainable caffeine concentration and preferably at least 50% of the maximum obtainable caffeine concentration, and preferably at least 70% of the maximum obtainable caffeine concentration when decaffeinating Robusta coffee, the maximum obtainable caffeine concentration being defined by the partition coefficient and the naturally occurring caffeine level in the green coffee being decaffeinated. Such a high caffeine concentration is very desirable because it reflects an efficient decaffeination system and it enables efficient recovery of the caffeine from the supercritical fluid as a valuable by-product.

In a batch system, however, as caffeine is partitioned from the green coffee beans contained therein, the maximum caffeine concentration obtainable in the supercritical fluid drops dramatically. Thus, a much larger amount of supercritical fluid is necessary in a batch system as compared to the countercurrent extraction system of the present invention to achieve the same degree of decaffeination. For example, to achieve 97% decaffeination of green coffee with supercritical carbon dioxide, approximately 5-8 times as much carbon dioxide is needed to decaffeinate the beans in a batch system as compared to the countercurrent system of the present invention. Further, the caffeine concentration of the caffeine-laden supercritical carbon dioxide exiting the countercurrent extraction system of the invention, said extraction system containing Milds coffee beans, is on the order of 190 ppm as compared to a batch system wherein the carbon dioxide exits at an average caffeine concentration of about 35 ppm. For Robusta coffee the caffeine concentration of the caffeine-laden supercritical carbon dioxide exiting the extraction system is on the order of 440 ppm as compared to a batch system concentration of 60 ppm. This increased caffeine concentration achieved by the countercurrent extraction of the invention is particularly important in allowing efficient recovery of the caffeine from the supercritical fluid.

Several caffeine removal techniques are known in the art. For example, the caffeine-laden supercritical fluid may be passed through an absorbent bed, such as a bed of activated carbon, to absorb the caffeine. Alternatively, the caffeine may be recovered by lowering the pressure of the caffeine-laden supercritical fluid so as to precipitate out both the caffeine and any enhancer that might be used. However, it has been found that supercritical fluids are not entirely selective for caffeine, but rather typically extract both non-caffeine solids and caffeine. For example, supercritical carbon dioxide typically extracts non-caffeine solids and caffeine at a weight ratio of about 1.5:1 to 3:1 non-caffeine solids to caffeine. Thus, if supercritical carbon dioxide extracts caffeine from green coffee so as to increase its caffeine concentration to 220 ppm, said fluid will also contain about 300 to 660 ppm non-caffeine solids. It has been found that the two methods described above for caffeine recovery, namely absorption and depressurization, fail to selectively recover caffeine. Rather, non-caffeine solids which are important to the flavor quality of coffee are lost from the supercritical fluid with the caffeine during caffeine recovery.

According to the present invention, the caffeine-laden supercritical fluid removed from the caffeine extraction vessel is continuously fed to a countercurrent liquid absorber. Continuous countercurrent liquid absorption systems are impractical and uneconomical for use in prior art supercritical fluid decaffeination systems because of the low caffeine concentration in the caffeine-laden supercritical fluid exiting the batch extractor. However, not only is a countercurrent absorber efficient and economical as used in the present invention, but it has additionally been found that polar fluids exhibit an excellent selectivity for caffeine when contacting caffeine-laden, non-caffeine solids containing supercritical fluids. As such, as the essentially caffeine-free supercritical fluid exits the absorber, it typically contains very nearly the same level of non-caffeine solids as it did upon entering the absorber. Thus, if this fluid is recycled to the caffeine extraction vessel, it extracts no measurable amount of non-caffeine solids from the green beans then being decaffeinated. As a result, the decaffeinated beans produced by the present invention are of a better flavor quality. Additionally, the yield loss generally associated with non-caffeine solids loss is eliminated by the process of the present invention.

According to the invention, the liquid absorber is operated under supercritical conditions. Typically the temperature and pressure within the absorber are identical, or very nearly identical, to the temperature and pressure conditions in the extraction vessel. As discussed hereinabove, the critical temperature and pressure will vary depending on the fluid employed. Absorber design is considered to be well within the ordinary skill of one in the art. Typically, the absorber is operated with a packing selected from those readily available in the art. Generally, the polar fluid is contacted with the supercritical fluid at a weight ratio of about 5:1 to 25:1, and typically about 10:1 to 20:1, supercritical fluid to polar fluid. Alternatively, the countercurrent absorber may be an empty column fitted with distributors for the carbon dioxide supercritical gas and water as described in co-pending application Ser. No. 07/229,369, filed Aug. 5, 1988, and entitled, "Caffeine Recovery from Supercritical Carbon Dioxide" which is hereby incorporated by reference. Water is the preferred polar fluid for use in the continuous countercurrent absorber of the present invention. It is preferred that the polar fluid of the invention remove at least 90% by weight of the caffeine contained in the caffeine-laden supercritical fluid, and more preferably 95% of the caffeine by weight.

Caffeine and acidic non-caffeine solids are recovered after extracting caffeine from a coffee material with supercritical carbon dioxide and then continuously absorbing caffeine from the carbon dioxide extractant by contact with an countercurrent water wash solution in an absorber. Wash solution from the absorber and containing caffeine is treated by reverse osmosis in a manner described in co-pending application Ser. No. 07/229,373, filed Aug. 5, 1988, entitled "Method for Decaffeinating Coffee Materials Including Reverse Osmosis Permeate Recycle" which is hereby incorporated by reference to form a permeate stream containing acidic dissolved non-caffeine solids and substantially no caffeine. In a first embodiment, at least a portion of the permeate solution is recycled to the absorber and used as at least a portion of the wash solution. In a second embodiment, at least a portion of the permeate solution is used to hydrate the coffee material prior to its decaffeination with a carbon dioxide extractant. Such use of a permeate solution containing acidic dissolved non-caffeine solids increases the decaffeination rate of the coffee material, and the use of the permeate solution for hydration of the raw coffee solids also increases the hydration rate. Where the coffee material comprises raw coffee solids, portions of the permeate solution containing acidic dissolved non-caffeine solids can be used both as recycle to the absorber and to hydrate the coffee material. In all cases recycle of non-caffeine coffee solids increases yield and overall coffee quality, particularly flavor.

Green coffee in the form of raw coffee solids is hydrated to a moisture content between 25-50% preferably about 30-45% prior to decaffeination. This is accomplished by means well known in the art such as steaming or soaking. For example, green coffee beans may be steamed soaked at about 100° C. for up to two hours. In another embodiment of the instant invention, an aqueous reverse osmosis permeate solution substantially free of caffeine, is used to moisten the raw coffee solids. The use of the permeate solution rather than city water increases the rate of hydration of the coffee material about 5-15% and increases the rate of decaffeination about 10-20%.

The invention is further described by reference to the figures. FIG. 1 shows a preferred embodiment of the caffeine extraction vessel. At steady state conditions, the extraction vessel 5 is filled with a bed of green coffee beans. An essentially caffeine-free supercritical fluid is fed to the first end of the extraction vessel 6 and caffeine-containing supercritical fluid is withdrawn from the second end of the extraction vessel 4. Green coffee is periodically admitted through valve 1 into blow case 2. Valves 3 and 7 are simultaneously opened intermittently so as to charge the green coffee from blow case 2 to the second end of the extraction vessel 4 and discharge a portion of substantially decaffeinated green coffee beans from the first end of the extraction vessel 6 to blow case 8. Valves 3 and 7 are then closed. Valve 9 is then opened to discharge the substantially decaffeinated green coffee from blow case 8. Additional green coffee is admitted through valve into blow case 2 and the procedure is repeated.

Figure 2:
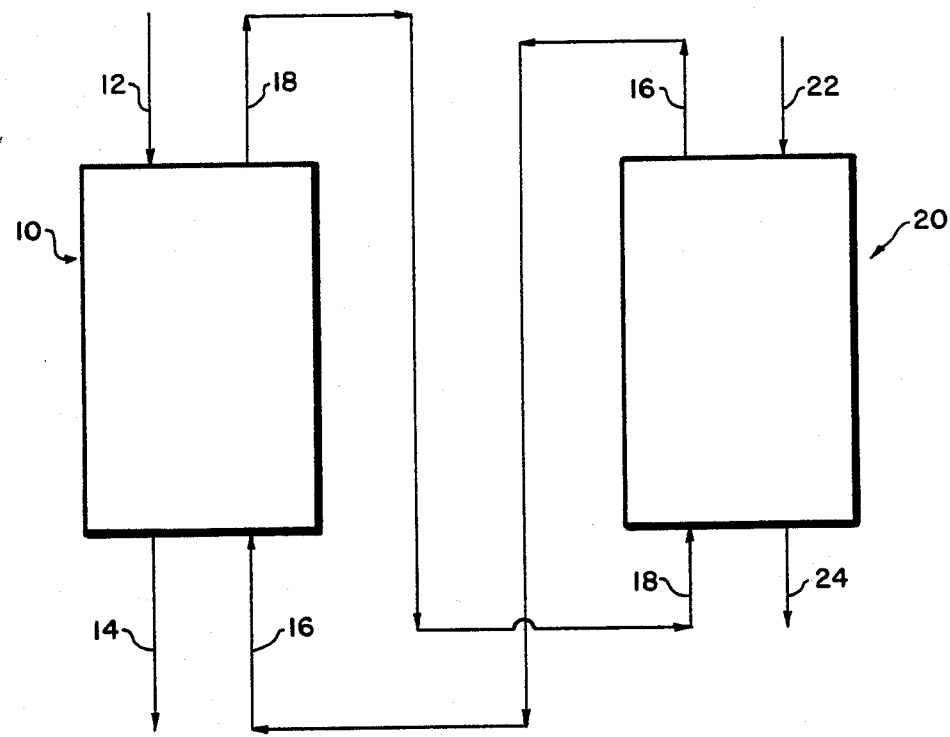
FIG. 2 is a schematic illustration showing a system for decaffeinating green coffee in an extraction vessel and recovering caffeine from the caffeine solvent in a liquid absorber.

FIG. 2 is a schematic illustration of a decaffeination system according to the invention wherein green coffee (12) is fed to an extraction vessel (10) and is removed therefrom as decaffeinated green coffee (14). An essentially caffeine-free supercritical fluid is fed countercurrently to the green beans as stream 16 into the extraction vessel, and exiting as a caffeine-laden fluid stream (18). The caffeine-laden stream (18) is then fed to a water absorber (20) and exits as an essentially caffeine-free supercritical fluid stream (16). Countercurrently, water is fed as stream 22 to the water absorber and exits as an aqueous caffeine containing stream (24).

Figure 3:
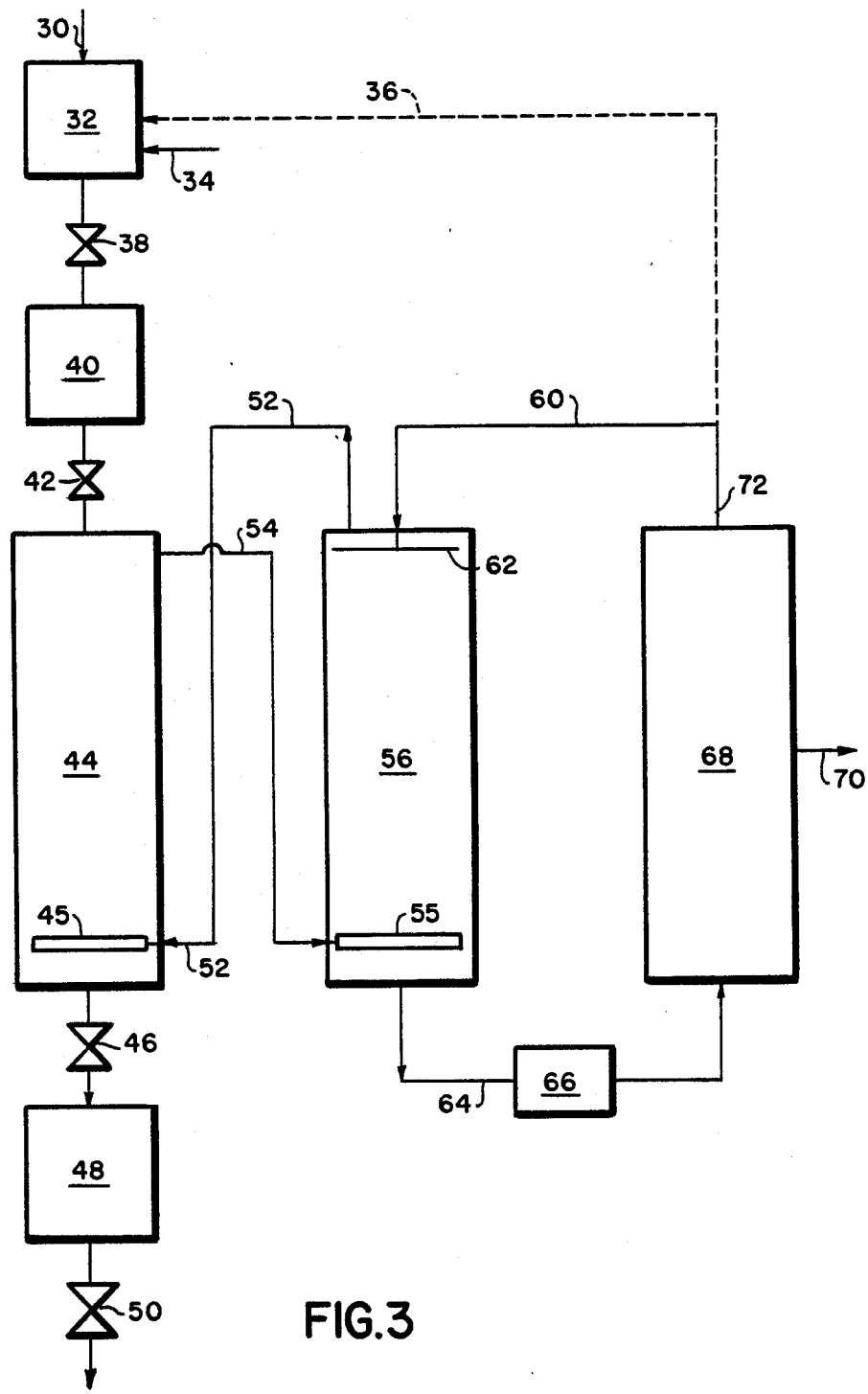
FIG. 3 is a schematic illustration showing a system for recovering nearly pure concentrated caffeine from the caffeine solvent and recycling the solvent to either the extractor or absorber with acidic non-caffeine coffee solids.

FIG. 3 is a schematic illustration of a preferred embodiment of a decaffeination system according to the invention wherein green coffee (30) is fed to a moisturizer (32) wherein fresh water (34) or permeate recycle (36) which is essentially free of caffeine but containing acidic non-caffeine solids or both are added to hot green coffee beans to moisturize them to between 25-50% water prefereably 30-45%. If desired both recycle and fresh water may be added and in most cases a portion of fresh makeup water must be added either to the green bean or absorber (56) or both. The moist beans are discharged from the moisturizer (32) through valve (38) to blow case (40) and thereafter fed under pressure into the extractor (44) through valve (42) while approximately 97% extracted coffee is discharged through valve (46) to pressurized blow case (48) and thereafter, on reducing the pressure, recovered through valve (50) dried, and further processed into decaffeinated coffee.

An essentially caffeine free supercritical carbon dioxide (52) is fed countercurrently to the green beans in extraction vessel (44) and exits as a caffeine-laden supercritical carbon dioxide (54) which is fed through a distributor (55) into an empty water absorber (contains no packing, plates or the like) (56) and exits as an essentially caffeine free supercritical carbon dioxide stream (52) which is recycled to the extractor (44).

Water (60), either fresh or recycled from reverse osmosis or a mixture thereof is fed countercurrently to the supercritical gas in absorber (56) through a distributor (62) to contact countercurrently the supercritical carbon dioxide and removed caffeine which is passed through line (64) to storage tank (66) and then to one or more reverse osmosis units operated either in series or parallel and shown collectively as (68) which concentrate the water laden caffeine from (66) some 5 to 100 times preferably 10-50 fold to produce relatively pure aqueous caffeine solution of 1 to 15% caffeine (70) which can be further processed by crystallization or other recognized means to pure caffeine. The permeate (72) from the reverse osmosis unit (68) which is rich in acidic, non-caffeine solids and contains substantially no caffeine (less than 0.010%) is recycled either to the water column (56) through line (60) or to the moisturizer or beans (36) or otherwise as by recycling a portion of the permeate to each of the beans and water column.

EXAMPLE 1

An elongated pressure vessel having a height about five times its diameter was loaded with 100% Colombian green coffee which was prewet to a moisture of about 30% to 40% by weight. Approximately 120 pounds of green coffee were contained in the pressure vessel. To the bottom of the pressure vessel was continuously fed essentially caffeine-free supercritical carbon dioxide at a pressure of about 250 atm. and a temperature of about 130° C. The carbon dioxide extracted caffeine and non-caffeine solids from the green coffee as it moved upwardly through the pressure vessel. The caffeine-laden supercritical carbon dioxide which also contained non-caffeine solids continuously exited the top of the pressure vessel. Each nineteen minutes, approximately 10% of the volume of the coffee bed was discharged into a bottom blow case while the same volume of prewet Colombian coffee was simultaneously charged from a previously loaded top blow case into the top of the pressure vessel. The total residence time of the green coffee in the pressure vessel was about 3 hours. The weight ratio of supercritical carbon dioxide to coffee was about 50 kg. carbon dioxide/kg. coffee.

The caffeine partition coefficient for supercritical carbon dioxide and green coffee beans has been measured to be about 0.026 at these operating conditions. The average caffeine concentration for Colombian Milds coffee is about 1.22% by weight on a dry basis or about 1.08% by weight as is. Thus, the maximum obtainable caffeine concentration in the supercritical carbon dioxide is about 280 ppm. The caffeine-laden supercritical carbon dioxide exiting the top of the pressure vessel was found to have a caffeine concentration of about 200 ppm, or about 71% of the maximum obtainable caffeine concentration. The caffeine-laden supercritical carbon dioxide was also found to contain about 350 ppm non-caffeine solids. The coffee discharged to the bottom blow case was found to be at least 97% decaffeinated by weight.

EXAMPLE 2

The caffeine-laden supercritical carbon dioxide from Example 1 was continuously fed to the bottom of an absorber measuring 4.3 inches in diameter, 40 feet in height, and with 32 feet packing height. The carbon dioxide was fed at a rate of 1350 lbs/hr. Water was fed to the top of the absorber at a rate of 110 to 120 lbs/hr. The absorber was operated at a pressure of about 250 atm. and a temperature of about 130° C. The following Table demonstrates the excellent selectivity for caffeine exhibited by the water, yielding a caffeine purity of about 88% which discounting minerals from water is 93.5% purity.

TABLE

|  | Rate (lb/hr) | Caffeine Conc (PPM) | Non-Caffeine Solids Conc. (PPM) |
|---|---|---|---|
| $CO_2$ Feed To Absorber | 1350 | 200 | 348 |
| $CO_2$ Exit From Absorber | 1350 | 19 | 332 |
| Water Feed To Absorber | 110–120 | 0 | 171* |
| Water Exit From Absorber | 110–120 | 2,450 | 340* (169) |

*Includes 171 ppm non-caffeine solids attributable to hardness of water.

The essentially caffeine-free supercritical carbon dioxide exiting the absorber was recycled to the extraction vessel of Example 1. The decaffeinated green coffee beans produced by recycling the essentially caffeine-free carbon dioxide containing non-caffeine solids was used to prepare a coffee brew (A). A control coffee brew (B) was prepared from identical beans decaffeinated with supercritical carbon dioxide which was essentially free of caffeine and non-caffeine solids. This supercritical carbon dioxide stream had passed through an activated carbon bed which had adsorbed caffeine and non-caffeine solids from a caffeine-laden supercritical carbon dioxide stream generated by the process of Example 1. Coffee brew A was judged by a panel of expert coffee tasters to be of superior flavor quality as compared to Coffee brew B. The improved flavor quality of brew A was attributed to the presence of non-caffeine solids in the recycled carbon dioxide which prevented the loss of valuable flavor precursor compounds from the green beans during decaffeination.

EXAMPLE 3

Green Colombian coffee beans are moisturized to 41.1% by contact with steam at 100° C. for about 2 hours in an agitated mixer. The moisturized coffee beans are added to a 4 inch ID×30 foot high extraction vessel by adding a volume of 0.2 cubic feet every 36 minutes to a blowcase, pressurizing the blowcase to system pressure and dropping these beans into the extraction vessel while removing an equal volume of decaffeinated coffee from the bottom into a pressurized blow case. The size of the blowcase is such as to give a 6 hour residence time of the coffee in the extractor.

Caffeine lean supercritical carbon dioxide with 7.1 ppm caffeine at 296.7 bar and 101.2° C. is recirculated countercurrently into the bottom of the extraction vessel at a flow rate of 1959 lb/hr and exits the top of the extractor at a caffeine concentration of 69.3 ppm. This caffeine rich supercritical carbon dioxide is countercurrently contacted with tap water at the same pressure and temperature in a 4 inch ID×40 foot high absorber which is empty (free of packing or plates). The water removes 89.8% of the caffeine from the supercritical carbon dioxide which is recirculated back to the extractor. Beans decaffeinated with this process have 95.06% of the caffeine removed in 6 hr which corresponds to a 0.501 $hr^{-1}$ decaffeination rate (assuming first order rate kinetics).

EXAMPLE 4

Another batch of Colombian green coffee beans (from the same lot as those above) is moisturized to 41.6% in the same agitated mixer as above. They too are added to the extraction vessel every 36 min. to effect a 6 hour residence time in the extractor.

Caffeine-lean supercritical carbon dioxide with 6.7 ppm caffeine at 297.5 bar and 99.9° C. is recirculated through the extractor at a flow rate of 1960 lb/hr and exits the top of the extractor at a caffeine concentration of 78.4 ppm. The caffeine rich supercritical carbon dioxide is countercurrently contacted with an acidic reverse osmosis permeate solution at the same pressure and temperature as in the extractor. The permeate solution removes 91.4% of the caffeine from the carbon dioxide which is then recirculated back to the extractor. The permeate solution is obtained by a method which is described below.

The caffeine-rich water which leaves the absorber is flashed to atmospheric pressure and is then sent to a reverse osmosis unit which concentrates the caffeine from 0.12% to 4.5%. The reverse osmosis membrane used is ZF-99 manufactured by Paterson Candy Incorporated. The water which permeates through the membrane has 0.002% caffeine content and a pH of 3.6. A small amount of tap water (about 4.5 lb) is added to bring the water flow rate to 163 lb/hr. This acidic solution is recycled back as feed to the water absorber.

Beans decaffeinated in this manner have 97.1% of the caffeine removed in 6 hrs which corresponds to a 0.588 $hr^{-1}$ decaffeination rate (assuming first order rate kinetics).

Example 4 exhibits a first order decaffeination rate constant of 0.588 $hr^{-1}$ which is 17% greater than the 0.501 $hr^{-1}$ value exhibited by Example 3.

We claim:

1. A method of decaffeinating green coffee in an extraction system comprising:
   (a) continuously feeding essentially caffeine-free supercritical carbon dioxide to the bottom portion of an extraction vessel containing moist green coffee beans for a period of time sufficient to transfer caffeine from the moist green coffee beans to the supercritical carbon dioxide, said transfer resulting in a caffeine concentration in the supercritical carbon dioxide which is at least 40% of the maximum obtainable caffeine concentration therein, said maximum obtainable caffeine concentration being defined by the caffeine partition coefficient for said supercritical carbon dioxide and;
   (b) withdrawing said supercritical carbon dioxide containing at least 40% of its maximum obtainable caffeine concentration from the top portion of the extraction vessel, said moistened green coffee beans in the extractor containing between 35% and 50% by weight moisture;
   (c) periodically discharging a portion of decaffeinated coffee beans from the bottom end of the extraction vessel and;
   (d) periodically charging a portion of moistened undecaffeinated green coffee beans to the top end of the extraction vessel;
   (e) contacting said caffeine laden supercritical carbon dioxide from step (b) countercurrently with an aqueous fluid in a substantially unobstructed absorber to transfer substantially all caffeine contained therein to the aqueous fluid with no appreciable transfer of non-caffeine solids to the aqueous fluid;
   (f) collecting the caffeine laden aqueous fluid and subjecting said caffeine laden fluid to reverse osmosis to recover a concentrated caffeine solution and an acidic aqueous permeate substantially free of caffeine and;

(g) adding the acidic permeate to the extraction system to reduce the green bean extraction time and improve green been quality.

2. The method of claim 1 wherein the permeate is added to the green coffee to moisturize the coffee.

3. The method of claim 1 wherein the permeate is countercurrently contacted with the supercritical carbon dioxide in the absorber.

4. The method of claim 1 wherein said acidic permeate has a pH of less than 5.

5. The method of claim 1 wherein said non-caffeine solids dissolved in said acidic permeate comprise organic acids.

6. The method of claim 1 wherein said permeate contains not more than about 0.010% caffeine by weight.

* * * * *